(12) United States Patent
Swift et al.

(10) Patent No.: US 10,520,042 B2
(45) Date of Patent: Dec. 31, 2019

(54) CLUTCH ASSEMBLY WITH INTEGRATED SURFACE COOLING

(71) Applicant: Rolls-Royce Corporation, Indianapolis, IN (US)

(72) Inventors: Joseph A. Swift, Indianapolis, IN (US); Kyle A. Hassler, Pittsboro, IN (US); Thaddeus Hendricks, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 778 days.

(21) Appl. No.: 14/967,476

(22) Filed: Dec. 14, 2015

(65) Prior Publication Data

US 2016/0178016 A1 Jun. 23, 2016

Related U.S. Application Data

(60) Provisional application No. 62/093,089, filed on Dec. 17, 2014.

(51) Int. Cl.
| | |
|---|---|
| *F16D 13/72* | (2006.01) |
| *F01D 25/12* | (2006.01) |
| *F02K 3/04* | (2006.01) |
| *F02C 3/107* | (2006.01) |
| *F02C 7/36* | (2006.01) |

(52) U.S. Cl.
CPC ............. *F16D 13/72* (2013.01); *F01D 25/12* (2013.01); *F02C 3/107* (2013.01); *F02C 7/36* (2013.01); *F02K 3/04* (2013.01); *F05D 2220/328* (2013.01); *F05D 2220/36* (2013.01); *F05D 2220/90* (2013.01); *F05D 2260/20* (2013.01); *F05D 2260/22141* (2013.01); *F05D 2260/4023* (2013.01); *Y02T 50/671* (2013.01); *Y02T 50/675* (2013.01)

(58) Field of Classification Search
CPC .. F16D 13/72; F02C 7/36; F02C 3/107; F01D 25/12; F02K 3/04; F05D 2260/20; F05D 2260/4023; F05D 2220/90; F05D 2220/328
See application file for complete search history.

(56) References Cited

U.S. PATENT DOCUMENTS

| | | | |
|---|---|---|---|
| 3,202,253 A * | 8/1965 | Bolster | F16D 13/72 188/264 E |
| 3,713,517 A | 1/1973 | Sommer | |

(Continued)

*Primary Examiner* — Andrew H Nguyen
(74) *Attorney, Agent, or Firm* — Fishman Stewart PLLC

(57) ABSTRACT

A clutch assembly may comprise a plurality of clutch discs and a housing configured to receive the plurality of clutch discs. The housing may include an outer wall and an inner wall defining a channel therebetween. The outer wall may have an inlet port and an outlet port in fluid connection with the channel. The channel may be configured to pass a first heat transfer medium between the inlet port and outlet port. The housing may include a plurality of surface features extending inwards from the inner wall and toward the plurality of clutch discs. The plurality of surface features is configured to transfer heat from second heat transfer medium to the housing, thereby transferring heat away from the plurality of clutch discs. The channel may be configured to transfer heat from the housing to the first heat transfer medium, thereby transferring heat away from the housing.

20 Claims, 2 Drawing Sheets

(56) References Cited

U.S. PATENT DOCUMENTS

| | | |
|---|---|---|
| 7,261,665 B2 | 8/2007 | Friedmann et al. |
| 7,934,997 B2 | 5/2011 | Avins et al. |
| 8,062,178 B2 | 11/2011 | Avny et al. |
| 2006/0006042 A1 | 1/2006 | Koenig |
| 2009/0114498 A1* | 5/2009 | Arnold .................... F16D 13/72 192/70.12 |
| 2010/0329844 A1* | 12/2010 | Bradbrook ................ F02C 7/36 415/61 |
| 2011/0024258 A1 | 2/2011 | Avny et al. |
| 2012/0080287 A1* | 4/2012 | Brevick .................. F16D 13/64 192/30 R |

* cited by examiner

CLUTCH ASSEMBLY WITH INTEGRATED SURFACE COOLING

CROSS-REFERENCE TO RELATED APPLICATIONS

This application claims priority to U.S. Provisional Patent Application No. 62/093,089 filed Dec. 17, 2014, the contents of which is hereby incorporated in its entirety.

GOVERNMENT RIGHTS

This disclosure was made with government support under N00019-02-C-3003 awarded by the Department of the Navy. The government has certain rights in the disclosure.

FIELD OF TECHNOLOGY

The present disclosure relates to gas turbine engines, and more particularly, but not exclusively, to an apparatus, system, and method including a dry clutch assembly having integrated surface cooling, thereby increasing the service life of the system and requiring less repair of the same.

BACKGROUND

Gas turbine engines typically include a compressor, a turbine, a combustor, and a shaft. The compressor compresses air drawn into the engine and delivers high pressure air to the combustor. In the combustor, fuel is mixed with the high pressure air and is ignited. Products of a combustion reaction in the combustor are directed into the turbine where work is extracted to drive the compressor and the shaft having a rotational speed. A clutch assembly may selectively couple the shaft to a fan such as a vertical lift fan. The clutch assembly may include one or multiple clutch discs.

To reduce the weight of the clutch assembly, the clutch assembly may include a dry clutch with one or a plurality of clutch discs. Dry clutches typically do not immerse the clutch discs in lubricating fluid. However, dry clutches generate more heat due to the lack of lubricating fluid. Specifically, dry clutches generate heat during an engagement period, e.g., when the rotational speed from the shaft is first translated to the fan. During the engagement period, a large amount of heat may be generated, which can have a detrimental impact on the functionality and life of the clutch assembly. Thus, it may be desirable to provide a dry clutch assembly configured for improved removal of heat.

It would therefore be helpful to provide an apparatus, system, and method including a dry clutch assembly having integrated surface cooling, thereby enhancing cooling of the clutch assembly.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

A clutch assembly such as a dry clutch assembly for a gas turbine engine may comprise one or a plurality of clutch discs and a housing including a cavity configured to receive the clutch discs. The housing may include an outer wall and an inner wall defining a channel therebetween. The outer wall may have an inlet port and an outlet port in fluid connection with the channel. The channel may be configured to pass a first heat transfer medium, external to the cavity, between the inlet port and outlet port. The housing may include a plurality of surface features, internal to the cavity, extending inwards from the inner wall and toward the plurality of clutch discs. The plurality of surface features may be configured to transfer heat from second heat transfer medium to the housing, thereby transferring heat away from the plurality of clutch discs. Then, the channel may be configured to transfer heat from the housing to the first heat transfer medium, thereby transferring heat away from the housing. Thus, the clutch assembly may be configured to utilize the surface features, internal to the cavity, and the channel, external to the cavity, to transfer heat away from the clutch discs and housing.

More specifically, the surface features may be configured as fins. The surface features may transfer heat from the first heat transfer medium (e.g., air inside the cavity) to a second heat transfer medium (e.g., a viscous fluid such as oil outside the cavity) being circulated through the channel. The surface features internal to the housing may be configured to increase the amount of surface area available to remove heat from the clutch discs using convection. Further, the channel may pass the heat to the second heat transfer medium, which conducts heat from the housing. In addition, the surface features may utilize air movement in the housing due to the rotating clutch discs. In addition, the channel may be connected to and utilize oil from a lubrication system for the clutch. Thus, the assembly may utilize the surface features inside the cavity to transfer heat to the channel outside the cavity, thereby transferring heat way from the clutch discs and housing.

The embodiments of the present disclosure may be adapted to a vehicle including any aircraft such as any airplane, helicopter, unmanned vehicle, fixed or variable wing vehicle, fixed or variable nozzle vehicle, or any other flying vehicle. Embodiments may also be adapted for industrial applications, power generators, pumping, naval propulsion, hover crafts, and any other vehicles.

Figure 1:
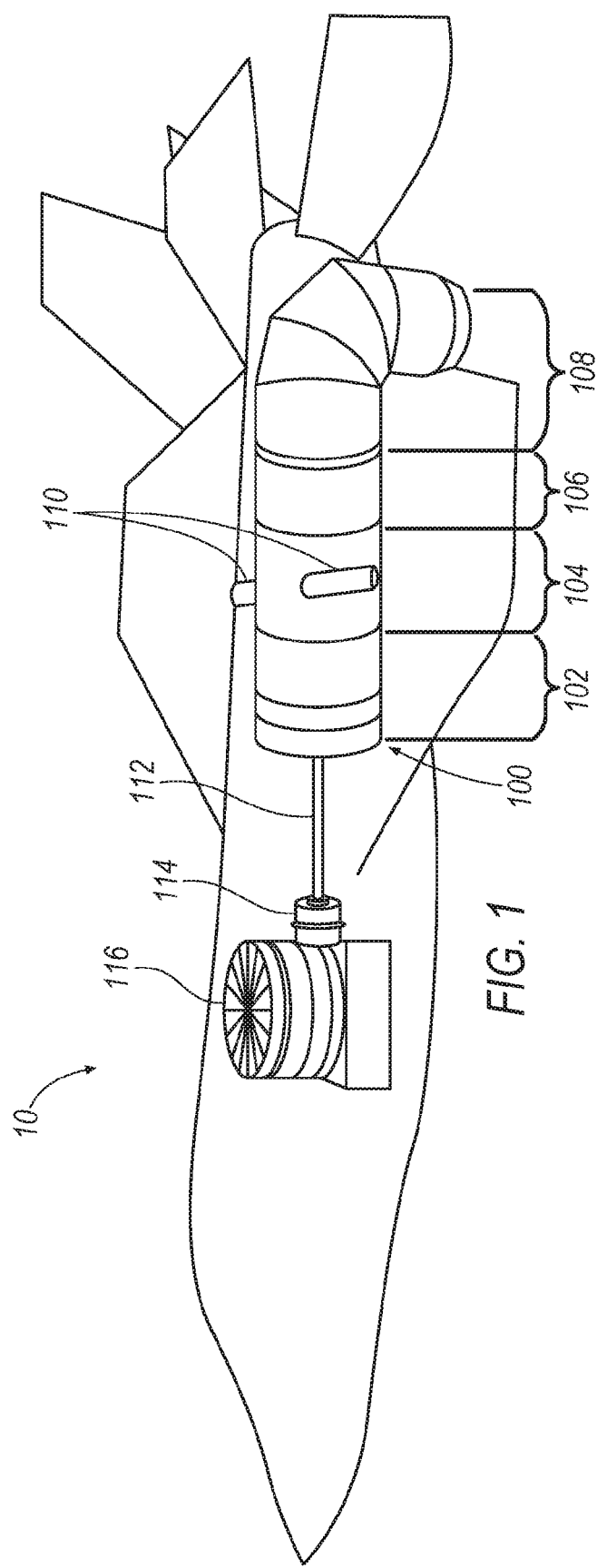
FIG. 1 schematically illustrates some aspects of one non-limiting example of a gas turbine engine system including a clutch assembly of the present disclosure.

FIG. 1 illustrates a vehicle 10 having a gas turbine engine system 100. The system 100 may include a compressor 102, a combustor 104, a turbine 106, a nozzle 108, a nozzle 110, a shaft 112, a clutch assembly 114, and a fan 116. The nozzle 108 may include a primary nozzle for variable thrust in vertical and flight directions. The nozzle 110 may include one or more roll nozzles for variable thrust in roll directions. The fan 116 may include a vertical lift fan for variable thrust in vertical directions. The clutch assembly 114 may be located at any or multiple portions of the system 100, for example, interposing and connecting the shaft 112 and fan 118, as shown. While FIG. 1 illustrates an exemplary configuration, it will be appreciated that compressor 102, combustor 104, turbine 106, nozzle 108, nozzle 110, shaft 112, clutch assembly 114, and fan 116 may be configured in any number of other configurations.

Figure 2:
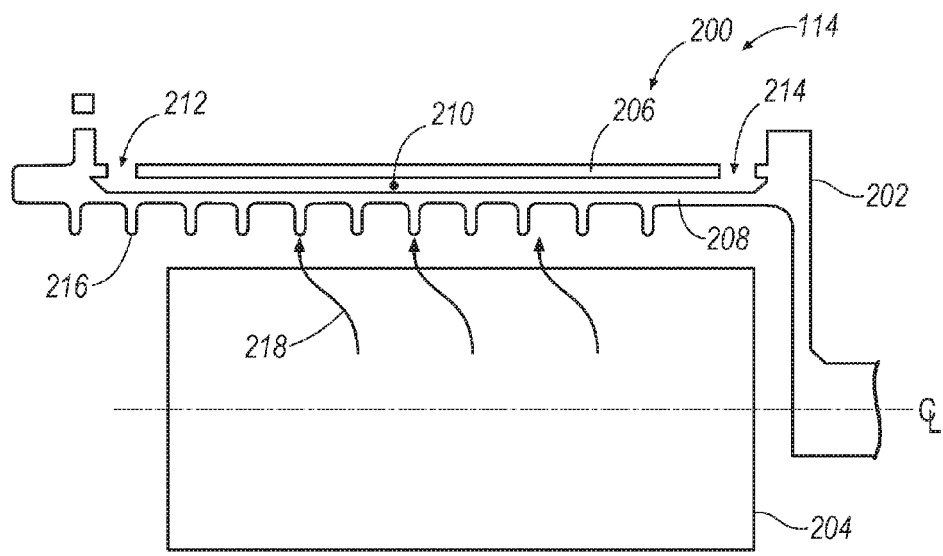
FIG. 2 illustrates a section view of the bearing assembly of FIG. 1, for example, including a clutch housing.

Turning now to FIG. 2, an embodiment of clutch assembly 114 may include system 200, for example, a dry clutch assembly. System 200 may include a housing 202 and one or more clutch discs 204. The housing 202 may include a cavity configured to receive the clutch discs 204. The housing 202 may include an outer wall 206 and an inner wall 208. The outer wall 206 and inner wall 208 may define a channel 210 therebetween. The channel 210 may be configured to transfer heat with respect to the housing 202, for example away from the housing 202. The outer wall may include an inlet port 212 and an outlet port 214. The inlet port 212 and outlet port 214 may be in fluid connection with the channel 210. The channel 210 may be configured to pass a first heat transfer medium (e.g., a viscous fluid such as oil) between the inlet port and outlet port. Thus, the channel 210 may be configured to transfer heat from the housing 202 to the first heat transfer medium, thereby transferring heat away from the housing 202.

The housing 202 may include one or a plurality of surface features 216. The surface features 216 may extend inwards from the inner wall 208 and toward the clutch discs 204. For example, the surface features 216 may include a plurality of fins protruding inward from the inner wall 208 and toward the clutch discs 204. The surface features 216 may be configured for transfer of heat with respect to the housing 202, for example, away from the housing 202. More specifically, the surface features 216 may be configured to transfer heat from a second heat transfer medium (e.g., air inside the cavity) to the inner wall 208 and to the channel 210. Alternatively, the surface features 216 may be configured as recesses or grooves into the inner wall 208. Thus, the surface features 216 may be configured to transfer heat from the second heat transfer medium to the housing, thereby transferring heat away from the clutch discs 204.

The surface features 216 and channel 210 may cooperate to transfer heat away from system 100. For example, the first heat transfer medium may include oil, between the outer wall 206 and inner wall 208, and the second heat transfer medium may include air, inside the inner wall 208. The surface features 216 may be configured to transfer heat from the second heat transfer medium to the housing 202, thereby transferring heat away from the clutch discs 204. More specifically, the heat may be transferred from the clutch discs 204, through the second heat transfer medium, and to the surface features 216 of the housing 202. Further, the channel 210 may be configured to transfer heat from the housing 202 to the first heat transfer medium, thereby transferring heat away from the housing. More specifically, the heat from surface features 216 may dissipate through the housing 202 and along the channel 210 of the housing 202, which may transfer the heat to the first heat transfer medium. As a result, the surface features 216 and channel 210 may operate to transfer heat away from the system 200. Alternatively or in addition, the channel 210 may include a second one or plurality of surface features in the channel 210, between the outer wall 206 and inner wall 208, which may be configured to facilitate transfer heat from the channel 210 to the first heat transfer medium.

Figure 3:
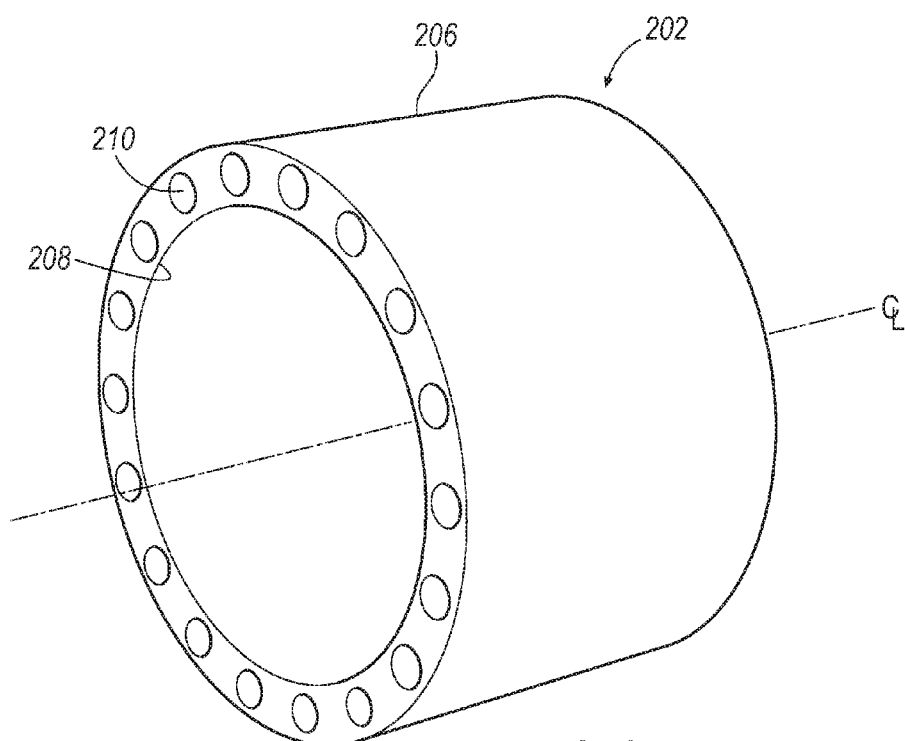
FIG. 3 illustrates an isometric view of a clutch housing of FIG. 2, for example, in a cylindrical configuration.

Turning now to FIG. 3, housing 202 may have a cylindrical configuration. The channel 210 may include a plurality of channels 210 that extend axially and substantially parallel to the central line axis. The number of channels 210 shown is exemplary and it will be appreciated that more or fewer channels 210 may be employed. The plurality of channels 210 may be radially positioned about a central axis of the housing 202, between the outer wall 206 and inner wall 208. The one or plurality of channels 210 may be formed from at least one of a machining operation and a casting operation on the housing 202. The plurality of surface features 216, e.g., along channel 210 or inside inner wall 208, may also be formed from at least one of a machining operation and a casting operation. An exemplary machining operation may include machining any surface described herein with an end mill or boring bar. An exemplary casting operation may include pouring liquid material into a mold having a hollow cavity of the desired shape, allowing the material to solidify, and then ejecting or breaking the mold from the solidified material. Thus, the housing 202 may be formed using one or a combination of manufacturing operations.

Methods for using a clutch assembly are also contemplated. A method may comprise providing a housing 202 configured to receive one or a plurality of clutch discs 204, including an outer wall 206 and an inner wall 208 defining a channel 210 therebetween, and including a plurality of surface features 216 extending inwards from the inner wall 208. The method may further comprise passing a first heat transfer medium relative to the channel 210, passing a second heat transfer medium relative to the plurality of surface features 216, transferring heat from second heat transfer medium to the housing 202 using the plurality of surface features 216 thereby removing heat from the clutch discs 204, and transferring heat from the housing 202 to the first heat transfer medium using the channel 210 thereby removing heat from the housing 202.

As mentioned above, the disclosed system is not limited to an aerospace or aircraft gas turbines. In one example, such as a power generation system, the gas turbine may be used to actuate a generator for producing electricity. As such, this disclosure provides an apparatus, system, and method for enhancing oil flow of any suitable bearing assembly.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:
1. A clutch assembly for a gas turbine engine system, the assembly comprising:
  a plurality of clutch discs;
  a housing configured to receive the plurality of clutch discs, the housing including:

an outer wall and an inner wall defining a channel therebetween and extending in an axial direction with respect to the plurality of clutch discs, the outer wall having an inlet port and an outlet port in fluid connection with the channel, the channel being configured to pass a first heat transfer medium between the inlet port and outlet port;

a plurality of surface features on an inner surface of the inner wall and axially between the inlet port that faces radially inward and the outlet port that faces radially outward relative to a central axis of the housing, and extending inwards from the inner surface of the inner wall and toward the plurality of clutch discs;

wherein the plurality of surface features is configured to transfer heat from a second heat transfer medium to the housing, thereby transferring heat away from the plurality of clutch discs; and wherein the channel is configured to transfer heat from the housing to the first heat transfer medium, thereby transferring heat away from the housing.

2. The assembly of claim 1, wherein the first heat transfer medium includes oil and the second heat transfer medium includes air.

3. The assembly of claim 1, wherein the plurality of surface features includes a plurality of fins protruding radially inward from the inner wall, and toward the plurality of clutch discs.

4. The assembly of claim 1, wherein the channel includes a plurality of circular channels radially positioned in a cylindrical configuration about the central axis of the housing and enclosed between the outer wall and the inner wall.

5. The assembly of claim 1, wherein the plurality of surface features includes a first plurality of surface features, and the channel includes a second plurality of surface features between the outer wall and the inner wall and configured to transfer heat between the second heat transfer medium and the housing.

6. The assembly of claim 1, wherein the channel is formed from at least one of a machining operation and a casting operation on the housing.

7. The assembly of claim 1, wherein the plurality of surface features, extending inwards from the inner wall and toward the plurality of clutch discs, is formed from at least one of a machining operation and a casting operation on the inner wall of the housing.

8. A gas turbine engine system comprising:
a turbine;
a shaft operatively connected to the turbine;
a fan configured to lift in a vertical direction; and
a clutch assembly operatively connecting the fan and the shaft, the clutch assembly including:
a plurality of clutch discs, and
a housing configured to receive the plurality of clutch discs, the housing including:
an outer wall and an inner wall defining a channel therebetween and extending in an axial direction with respect to the plurality of clutch discs, the outer wall having an inlet port and an outlet port in fluid connection with the channel, the channel being configured to pass a first heat transfer medium between the inlet port and outlet port,
a plurality of surface features on an inner surface of the inner wall and axially between the inlet port that faces radially inward and the outlet port that faces radially outward relative to a central axis of the housing, and extending inwards from the inner surface of the inner wall and toward the plurality of clutch discs, wherein the plurality of surface features is configured to transfer heat from a second heat transfer medium to the housing, thereby transferring heat away from the plurality of clutch discs, and wherein the channel is configured to transfer heat from the housing to the first heat transfer medium, thereby transferring heat away from the housing.

9. The system of claim 8, wherein the first heat transfer medium includes oil and the second heat transfer medium includes air.

10. The system of claim 8, wherein the plurality of surface features includes a plurality of fins protruding radially inward from the inner wall and toward the plurality of clutch discs.

11. The system of claim 8, wherein the channel includes a plurality of circular channels radially positioned in a cylindrical configuration about the central axis of the housing and enclosed between the outer wall and the inner wall.

12. The system of claim 8, wherein the plurality of surface features includes a first plurality of surface features, and the channel includes a second plurality of surface features between the outer wall and the inner wall and configured to transfer heat between the second heat transfer medium and the housing.

13. The system of claim 8, wherein the channel is formed from at least one of a machining operation and a casting operation on the housing.

14. The system of claim 8, wherein the plurality of surface features, extending inwards from the inner wall and toward the plurality of clutch discs, is formed from at least one of a machining operation and a casting operation on the inner wall of the housing.

15. A system comprising:
a plurality of clutch discs about a central axis; and
a housing configured to receive the plurality of clutch discs, the housing including an outer wall and an inner wall defining a channel therebetween and extending in an axial direction with respect to the plurality of clutch discs, and the housing including a plurality of surface features on an inner surface of the inner wall and axially between the inlet port that faces radially inward and the outlet port that faces radially outward relative to the central axis, and extending from the inner surface of the inner wall toward the central axis,
wherein the channel is configured to pass a first heat transfer medium relative to the channel and along the axial direction to transfer heat from the housing to the first heat transfer medium using the channel, thereby removing heat from the housing, and
wherein the plurality of surface features is configured to engage a second heat transfer medium that transfers heat from the second heat transfer medium to the housing using the plurality of surface features, thereby removing heat from the plurality of clutch discs.

16. The system of claim 15, wherein the first heat transfer medium includes oil and the second heat transfer medium includes air.

17. The system of claim 15, wherein the plurality of surface features includes a plurality of fins protruding radially inward from the inner wall and toward the plurality of clutch discs.

18. The system of claim 15, wherein the channel includes a plurality of circular channels radially positioned in a cylindrical configuration about the central axis and enclosed between the outer wall and the inner wall.

19. The system of claim 15, wherein the channel includes a second plurality of surface features between the outer wall and the inner wall and configured to transfer heat between the second heat transfer medium and the housing.

20. The system of claim 15, wherein the plurality of surface features, extending inwards from the inner wall and toward the plurality of clutch discs, is formed from at least one of a machining operation and a casting operation on the housing.

\* \* \* \* \*